(12) United States Patent
Fresard et al.

(10) Patent No.: US 8,092,934 B2
(45) Date of Patent: Jan. 10, 2012

(54) ENERGY STORAGE DEVICE HAVING A COLLECTOR PLATE

(75) Inventors: Alex Fresard, Encinitas, CA (US); James L. Borkenhagen, Spring Valley, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 1313 days.

(21) Appl. No.: 11/690,743

(22) Filed: Mar. 23, 2007

(65) Prior Publication Data

US 2007/0231699 A1 Oct. 4, 2007

Related U.S. Application Data

(60) Provisional application No. 60/785,892, filed on Mar. 24, 2006.

(51) Int. Cl.
*H01M 6/00* (2006.01)
*H01M 10/00* (2006.01)

(52) U.S. Cl. ....................................................... 429/122
(58) Field of Classification Search ........................ None
See application file for complete search history.

(56) References Cited

U.S. PATENT DOCUMENTS

| | | | |
|---|---|---|---|
| 5,172,307 A | 12/1992 | Tabuchi | |
| 5,862,035 A | 1/1999 | Farahmandi | |
| 2002/0034680 A1* | 3/2002 | Inoue et al. | 429/94 |
| 2002/0110729 A1* | 8/2002 | Hozumi et al. | 429/130 |
| 2003/0086239 A1 | 5/2003 | Bendale | |
| 2006/0281252 A1 | 12/2006 | Oversteyns | |
| 2008/0261108 A1* | 10/2008 | Jeong | 429/164 |
| 2009/0303659 A1 | 12/2009 | Zhong | |

FOREIGN PATENT DOCUMENTS

| | | |
|---|---|---|
| EP | 51372 A | 12/1982 |
| JP | 07220981 A | 8/1995 |
| JP | 12-138052 | 5/2000 |
| JP | 12-331671 A2 | 11/2000 |
| JP | 13-102031 A2 | 4/2001 |
| WO | 2004084246 A1 | 9/2004 |
| WO | 2007130059 | 11/2007 |

\* cited by examiner

*Primary Examiner* — Barbara Gilliam
*Assistant Examiner* — Stephan Essex
(74) *Attorney, Agent, or Firm* — Knobbe Martens Olson & Bear LLP

(57) ABSTRACT

In one embodiment, an energy storage device comprises a container containing a first electrode generating a positive charge, a second electrode generating a negative charge, and an electrolyte in ionic contact with the electrodes. The container comprises a base and one or more walls defining an opening in the container, the base having a first terminal in electrical connection with the first electrode. A cap is shaped to close the opening and is electrically isolated from the container, while having a second terminal in electrical connection with the second electrode. A collector plate is interposed between the first electrode and the base and is electrically conductive, providing the electrical connection between the first electrode and the first electrical terminal and exhibiting an extension with a concave side oriented in the direction of the base, which is connected to the base by interference fitting against a mating protrusion on the base.

13 Claims, 2 Drawing Sheets

ENERGY STORAGE DEVICE HAVING A COLLECTOR PLATE

CROSS-REFERENCE TO RELATED APPLICATIONS

This non-provisional patent application claims a benefit of priority under 35 U.S.C. 119 to previously filed provisional patent application Ser. No. 60/785,892 filed Mar. 24, 2006.

BACKGROUND

1. Field

The present invention relates to an energy storage device having a collector plate, and, more particularly, to an energy storage device and a method of manufacturing thereof, wherein a collector plate is interposed between an electrode and a conductive terminal, so to provide an improved distribution of the electrical charge from the electrode to the base and reduced manufacturing costs.

2. Related Art

Energy storage devices generally comprise a plurality of electrodes that are in ionic contact with an electrolyte, and that provide a negative charge to a negative terminal and a positive charge to a positive terminal.

One type of energy storage device is a capacitor, wherein each electrode is formed by an activated carbon mixture spread over a metallic sheet serving as a collector for the electrode charge. Each electrode/collector sheet combination is separated from the adjacent electrode/collector sheet combination by a dielectric material, for example, by a paper sheet.

In one type of capacitor, the electrode/collector sheet/dielectric material/electrode/collector sheet assembly is would together to form a spiral composition, known in the industry as a "jellyroll." A suitable container of tubular shape houses the jellyroll and the electrolyte, the container having a negative electric terminal at one end and a positive electric terminal at the opposite end that are electrically isolated one from the other.

The operation of the capacitor is made possible by causing the collector sheet supporting the negatively charged electrode to be connected to the negative terminal, and the collector sheet supporting the positively charged electrode to be connected to the positive terminal. Such a collector sheet/terminal connection is generated by having the collector sheet carrying the negative charge to extend out of one edge of the jellyroll to come in contact with the negative terminal, and by having the collector sheet carrying the positive charge to extend from the opposite edge of the jellyroll to come in contact with the positive terminal. The collector sheet/terminal connection may be insured by means of a laser welding process, during which a collector sheet is laser-welded in predetermined points to the respective container base carrying the terminal. This laser welding process, however, limits the number of connection points between the collector sheet and the base, and is time-consuming to perform. Further, the laser welding process may cause perforations in the container base, generating leaks of the electrolyte that must be prevented or corrected by sealing the base with a suitable compound, such as an epoxy compound.

Therefore, there is a need for an energy storage system having larger contact area between the collector sheet and the base carrying the electric terminal.

There is a further need for an energy storage device with reduced manufacturing times in comparison with the prior art.

There is a still further need for an energy storage device that does not need preventive or corrective care to avoid electrolyte leaks caused by the laser welding process.

SUMMARY

In one embodiment, an energy storage device comprises a container suitable for containing a first electrode generating a positive charge, a second electrode generating a negative charge, and an electrolyte in ionic contact with the first and the second electrodes. The container comprises a base and one or more walls defining an opening in the container, which base includes a first electrically conductive terminal in electrical connection with the first electrode. A cap is shaped to close the opening, and is electrically isolated from the container while providing a second electrically conductive terminal in electrical connection with the second electrode. A collector plate is interposed between the first electrode and the base. Such a collector plate is electrically conductive and provides the electrical connection between the first electrode and the first electrical terminal. Further, such a collector plate is shaped to exhibit an extension with a concave side oriented in the direction of the base, which concave side is connected to the base by interference fitting against a mating protrusion extending from the base.

In another embodiment, an energy storage device comprises a container suitable for containing a first electrode generating a positive charge, a second electrode generating a negative charge, and an electrolyte in ionic contact with the first and the second electrodes. The container comprises a base and one or more walls defining an opening in the container, which base includes a first electrically conductive terminal in electrical connection with the first electrode. A cap is shaped to close the opening, and is electrically isolated from the container while providing a second electrically conductive terminal in electrical connection with the second electrode. A collector plate is interposed between the second electrode and the cap. Such a collector plate is electrically conductive and provides the electrical connection between the second electrode and the cap. Further, such a collector plate is shaped to exhibit an extension with a convex side in the direction of the second electrode and a concave side in the direction of the cap, and is connected to the cap by interference fitting the concave side of the collector plate against a mating protrusion extending form the cap.

Other embodiments of the invention comprise methods for manufacturing the above described energy storage devices.

BRIEF DESCRIPTION OF THE DRAWINGS

Embodiments of the disclosed method and apparatus will be more readily understood by reference to the following figures, in which like reference numbers and designations indicate like elements.

DETAILED DESCRIPTION

A detailed description of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
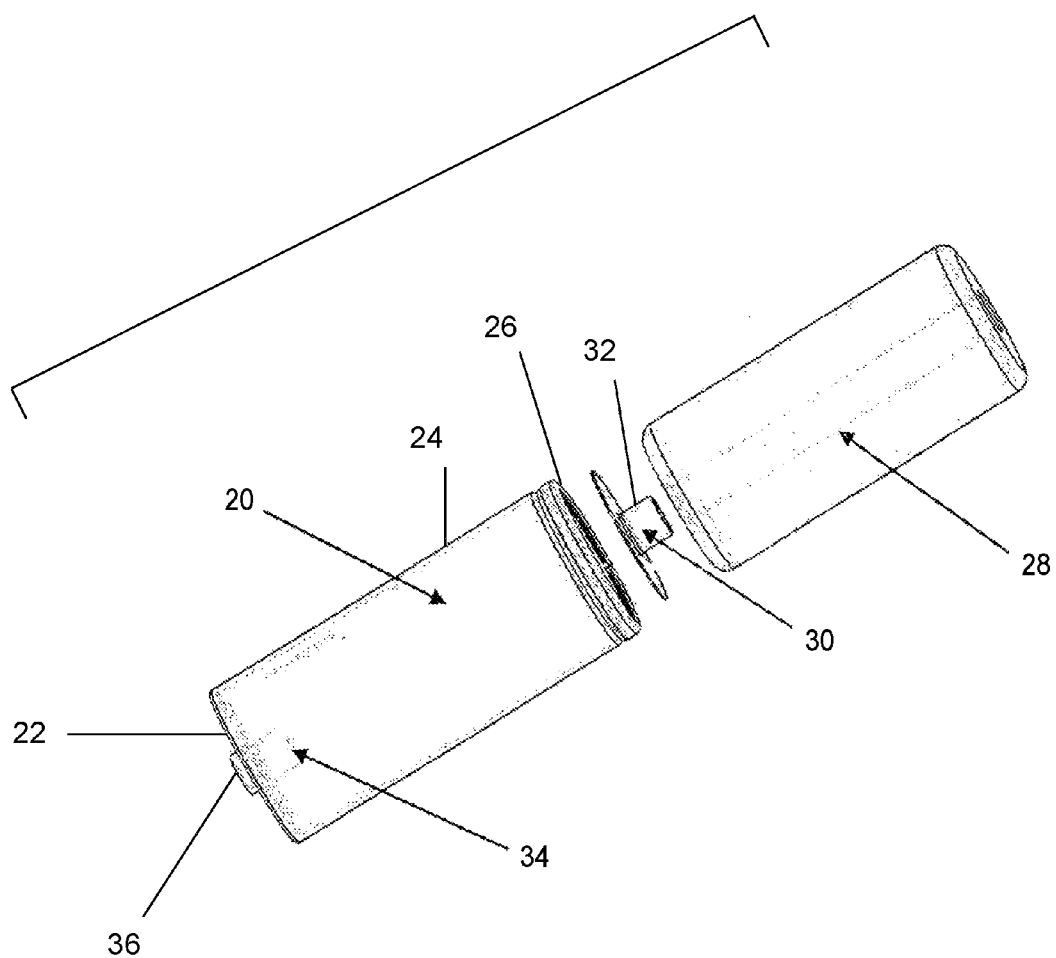
FIG. 1 illustrates an exploded view of an energy storage device manufactured according to one embodiment of the present invention.

Turning to FIG. 1, there is shown a first embodiment of the invention. The following description relates to a capacitor; however, one skilled in the art will recognize that the following description also applies to other types of energy storage devices, for instance, to certain varieties of batteries.

A container 20 houses a first electrode that generates a positive charge, a second electrode that generates a negative charge, and an electrolyte that is in ionic contact with the first and the second electrodes. Each electrode typically is formed from a material containing an activated carbon mixture; however, one skilled in the art will appreciate that other electrode materials may be employed.

Container 20 comprises a base 22 and a cylindrical wall 24 defining an opening 26 opposite to base 22. In variants of this embodiment, more than one wall may be present, for instance, four walls may be present if the base has a square perimeter.

Base 22 contains a first electrical terminal 36 that is connected with the first electrode, thereby providing a positive charge to the user of the capacitor. At the opposite end of container 20, opening 26 is closed by a conductive cap (not shown) that is electrically connected to the second electrode and that provides a negative charge. In order to avoid a short circuit, the conductive cap is electrically isolated from wall 24.

Each of the first and second electrodes is supported by a collector sheet, namely, a first collector sheet supports the activated carbon mixture forming the first electrode, and a second collector sheet supports the activated carbon mixture forming the second electrode. Each of the first and second collector sheets is electrically conductive and transmits the charge from the supported electrode to the base or to the conductive cap as appropriate.

The combination of the first electrode and of the first collector sheet on one side, and of the second electrode and of the second collector sheet on the other side, are separated by a dielectric sheet and are spirally wound together to form a "jellyroll," identified in FIG. 1 by numeral 28. Within jellyroll 28, the activated carbon mixture is situated in the central axial portion, and in not present at the top or bottom bases of the jellyroll. Instead, the free edge of the first collector sheet, but not of the second collector sheet, extends in the direction of base 22, and the free edge of the second collector sheet, but not of the first collector sheet, extends in the direction of the conductive cap.

Figure 2A:
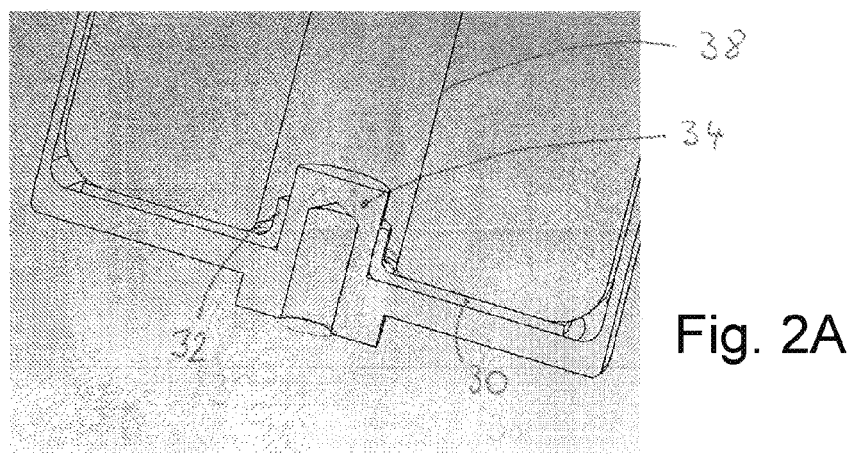
FIGS. 2A-2B illustrate a cross-sectional view of a portion of the energy storage device of FIG. 1, wherein the positioning of collector plate between the electrodes and the container base is shown in greater detail.
Figure 2B:
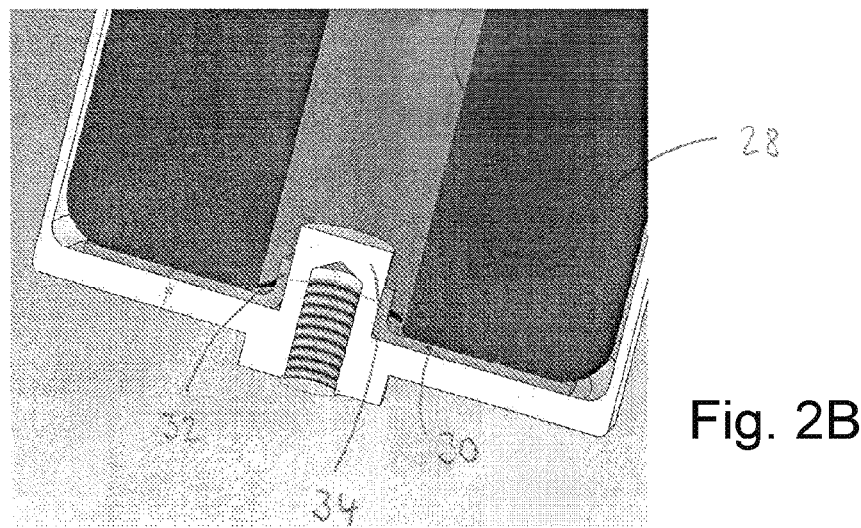

Turning now to FIGS. 2A-2B, there is shown that the jellyroll has an inner core portion that is hollow. A collector plate 30 is interposed between the first collector sheet and base 22, and is made of an electrically conductive material. Collector plate 30 comprises an extension 32 that has a convex side, oriented in the direction of jellyroll 28, and a concave side, oriented in the direction of base 22. A protrusion 34 extends inward inside container 20, and has a shape mating the concave face of extension 32.

Protrusion 34 and the concave side of extension 32 are of such dimensions that the concave side of extension 32 can be interference fit on protrusion 34, creating both a mechanical and an electrical connection between collector plate 30 and base 22. At the same time, the convex sides of extension 32 and of protrusion 34 reside in the hollow portion of jellyroll 28.

The free edge of the first collector sheet, that comes in contact with collector plate 30, is laser welded to collector plate 30, creating a permanent mechanical and electrical connection. Jellyroll 28, with collector plate attached to it, is then inserted into container 20, position on the inner side of base 22, and in electrical contact with base 22.

In a variant of the present embodiment, collector plate 30 is welded (for instance, laser welded) to create an improved mechanical and electrical connection with base 22.

The practice of the present invention provides for an improved area of contact between the first collector sheet and base 22 in comparison with the prior art. Further, the practice of the present invention provides for a faster assembly of the energy storage device and an improved production yield than in the prior art.

Figure 3:
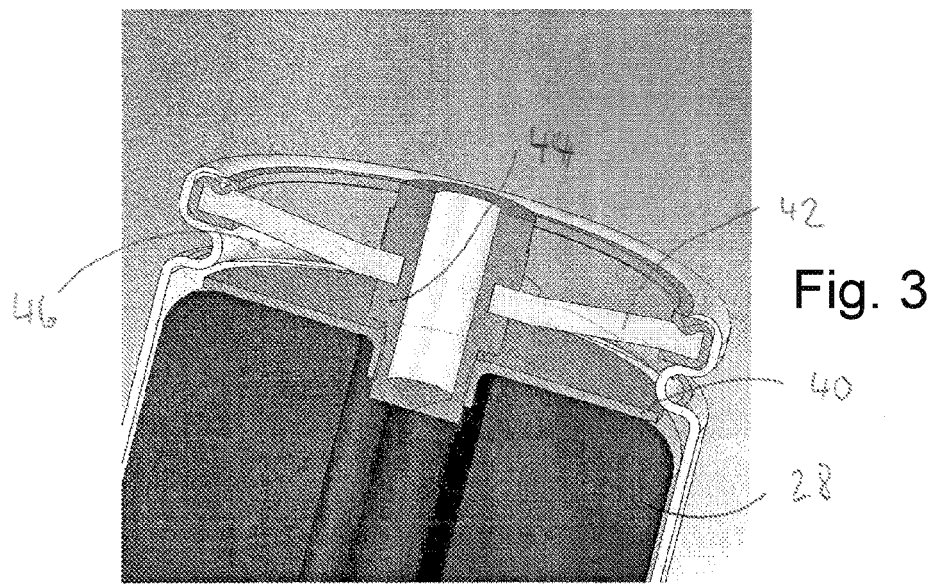
FIG. 3 illustrates a cross-sectional view of an energy storage device having a collector plate interposed between the electrodes and the container cap.

Turning now to FIG. 3, there is shown a second embodiment of the invention. A collector plate 40 is positioned in contact with the free edge of the second collector sheet, between conductive cap 42 and jellyroll 28. Collector plate 42 is also interference fit with a protrusion 44 extending from conductive cap 42, and is laser welded to the free edge of the second collector sheet, in like fashion as for the first embodiment. The transmission of charge between the second collector sheet and conductive cap 42 is provided by protrusion 44, because a gap between collector plate 40 and conductive cap 42 provides for a headroom in the capacitor.

In a third embodiment of the invention, two collector plates are present, one in contact with each free edge of the jellyroll.

While the invention has been described in connection with the above described embodiment, it is not intended to limit the scope of the invention to the particular forms set forth, but on the contrary, it is intended to cover such alternatives, modifications, and equivalents as may be included within the scope of the invention.

What is claimed is:

1. An energy storage device comprising:
   a container comprising first and second portions, one of the first and second portions having a base and one or more walls defining an opening therein, the other of the first and second portions comprising a cap shaped to close the opening;
   the container containing a first electrode generating a charge of a polarity, and containing a second electrode generating a charge differing in polarity from that of the first electrode;
   the first portion comprising a first electrically conductive terminal in electrical connection with the first electrode, the second portion comprising a second electrically conductive terminal in electrical connection with the second electrode; and
   the container further containing a first collector plate interposed between the first electrode and the first portion, the first collector plate being electrically conductive and providing the electrical connection between the first electrode and the first electrical terminal, and wherein the first collector plate is connected to the first portion by an interference fit of a feature of the first collector plate to a mating feature of the first portion;
   the base being electrically isolated from the cap;
   the container containing an electrolyte in ionic contact with the first and the second electrodes; and wherein the portion having a base and one or more walls defining an opening therein is the first portion and the portion comprising a cap shaped to close the opening is the second portion.

2. The energy storage device of claim 1 wherein the interference fit comprises an interference fit of a concave side oriented in a direction of an end of the energy storage device of the first collector plate with a mating protrusion extending from the first portion.

3. The energy storage device of claim 1 wherein the portion having a base and one or more walls defining an opening therein is the second portion and the portion comprising a cap shaped to close the opening is the first portion.

4. The energy storage device of claim 1 wherein the charge generated by the first electrode is positive and the charge generated by the second electrode is negative.

5. The energy storage device of claim 1, wherein the energy storage device is a capacitor.

6. The energy storage device of claim 1, wherein at least a portion of the first collector plate is welded to the base.

7. The energy storage device of claim 1, further comprising:

a first collector sheet supporting the first electrode, a second collector sheet supporting the second electrode, the first collector sheet conducting charge from the first electrode to the first collector plate, and thence to the first portion; and the second collector sheet conducting charge from the second electrode to the second portion, wherein the combination of the first electrode and of the first collector sheet on one side, and of the second electrode and of the second collector sheet on the other side, are separated by a dielectric sheet and are spirally wound together.

8. The energy storage device of claim 7, wherein at least a portion of an edge of the first collector sheet is welded to the first collector plate.

9. The energy storage device of claim 8, wherein the at least a portion of the edge of the first collector sheet is laser welded to the first collector plate.

10. An energy storage device comprising:

a container comprising first and second portions, one of the first and second portions having a base and one or more walls defining an opening therein, the other of the first and second portions comprising a cap shaped to close the opening;

the container containing a first electrode generating a charge of a polarity, and containing a second electrode generating a charge differing in polarity from that of the first electrode;

the first portion comprising a first electrically conductive terminal in electrical connection with the first electrode, the second portion comprising a second electrically conductive terminal in electrical connection with the second electrode; and the container further containing a first collector plate interposed between the first electrode and the first portion, the first collector plate being electrically conductive and providing the electrical connection between the first electrode and the first electrical terminal, and wherein the first collector plate is connected to the first portion by an interference fit of a feature of the first collector plate to a mating feature of the first portion;

the base being electrically isolated from the cap;

the container containing an electrolyte in ionic contact with the first and the second electrodes; and a second collector plate interposed between the second electrode and the second portion, the second collector plate being electrically conductive and providing the electrical connection between the second electrode and the second portion, wherein the second collector plate is connected to the second portion by an interference fit of a feature of the second collector plate against a mating feature of the second portion.

11. The energy storage device of claim 10 wherein the interference fit comprises an interference fit of a concave side oriented in a direction of an end of the energy storage device of the second collector plate with a mating protrusion extending from the second portion.

12. The energy storage device of claim 10, wherein at least a portion of an edge of the second collector sheet is welded to the second collector plate.

13. The energy storage device of claim 11, wherein the at least a portion of the edge of the second collector sheet is laser welded to the second collector plate.

* * * * *